Figure 1:
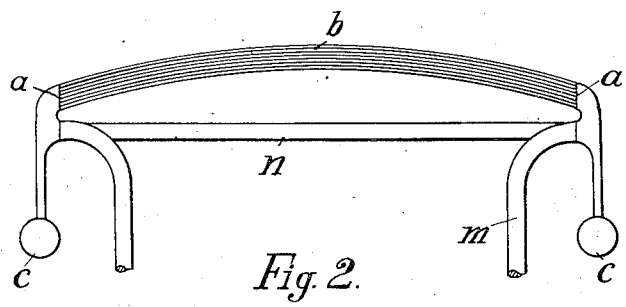

Inventor:
Ottmar Conradty

June 2, 1936.　　　　O. CONRADTY　　　　2,042,653
COLLECTOR FOR ELECTRIC CARS
Filed April 23, 1932　　　　2 Sheets-Sheet 2
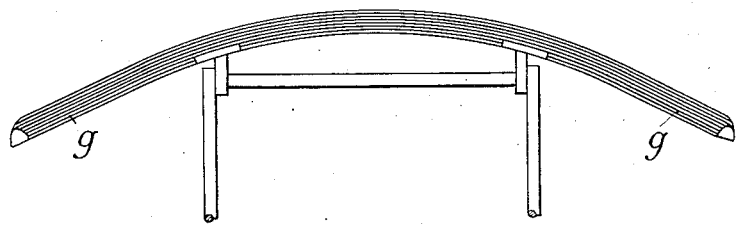
Fig. 7.
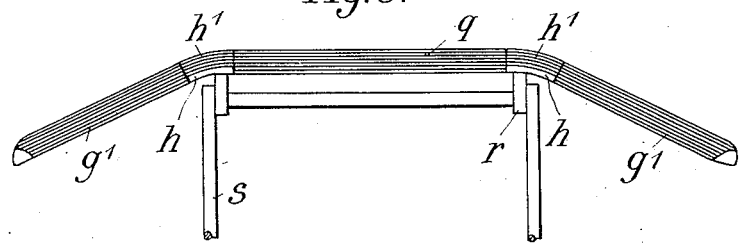
Fig. 8.
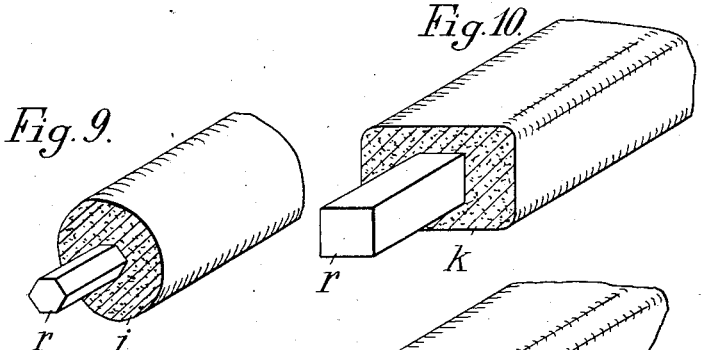
Fig. 9.　　Fig. 10.
Fig. 11.
Inventor:
Ottmar Conradty Patented June 2, 1936

2,042,653

UNITED STATES PATENT OFFICE 2,042,653

COLLECTOR FOR ELECTRIC CARS

Ottmar Conradty, Nuremberg, Germany

Application April 23, 1932, Serial No. 607,200
In Germany April 25, 1931

4 Claims. (Cl. 191—55)

My invention relates to improvements in collectors for electric cars, and more particularly in collectors of the type comprising blocks of carbon or similar material sliding on the trolley-wire. As is known to those skilled in the art, the collecting members made from carbon are rockingly mounted so that they are adapted for surface contact with the line. For this reason, in constructions now in use straight collectors have been used, and it has not been possible to provide rockingly mounted carbon blocks having a curved form. Heretofore a curved collector block made from carbon has been used; however, the said block was not rockingly mounted, and it has not come into practical use for the reason that surface contact of rigidly mounted curved collector blocks is not insured. The straight collectors having rockingly mounted collector blocks are not quite satisfactory for the reason that where the wire has not been properly mounted a slack section thereof may be caught by the ends of the collector, so that the collector is injured, and in some cases, the wire is torn from its support. This is particularly objectionable in collectors which are pressed on the wire from below and in vertical direction.

The object of the improvements is to provide a collector of the class referred to which has a curved form, and in which the carbon blocks are rockingly mounted, so that the objections of the straight collector are obviated. With this object in view my invention consists in the matters to be described hereinafter and particularly pointed out in the appended claims.

For the purpose of explaining the invention several examples embodying the same have been shown in the accompanying drawings, in which the same letters of reference have been used in all the views to indicate corresponding parts. In said drawings, Fig. 1 is an elevation showing a curved collector in which the collecting member is rockingly mounted on a pole or bail, the pivotal axis of the collector being disposed eccentrically of the collecting member, and the collecting member being provided with a weighted body or weighted bodies for balancing the same, Fig. 2 is a similar elevation showing a modification in which the curved collecting member is formed at both ends with curved portions extending beyond the fulcrum of the collecting member and having the function of the weighted body shown in Fig. 1, Fig. 3 is a similar elevation showing another modification in which the main portion of the collector is rectilinear, the said rectilinear portion being provided at its ends with curved portions extending beyond the fulcrum of the collector, Fig. 4 is a sectional elevation on an enlarged scale taken on the line 4—4 of Fig. 3 and showing an end piece having a lining of carbon fixed thereto by a dovetail joint.

Figure 5:
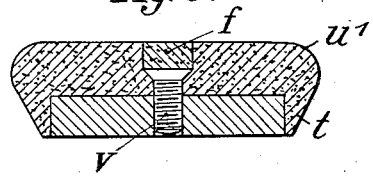
Figure 6:
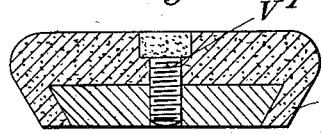

Fig. 5 is a similar sectional elevation showing a modification in which the carbon linings are fixed to the metallic end pieces by screws, Fig. 6 is a similar sectional elevation showing a modification in which the linings of carbon are fixed to metallic end pieces by dovetail joints and screws made from hard carbon or coal.

Figure 2:
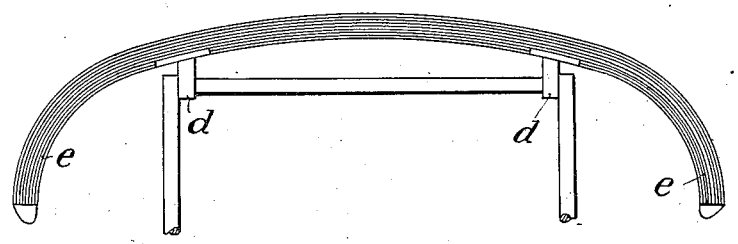
Figure 3:
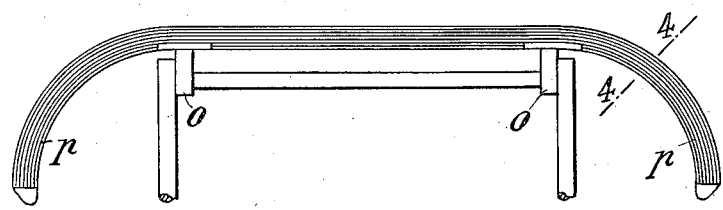
Figure 4:
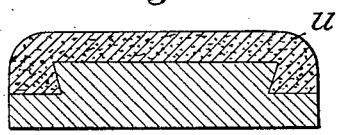

Fig. 7 is an elevation similar to those illustrated in Figs. 1 to 3 and showing a modification in which a curved collector is provided at its ends with rectilinear extensions, Fig. 8 is a similar elevation showing a modification in which a rectilinear collector is provided at its ends with rectilinear extensions, and Figs. 9, 10 and 11 are perspective sectional views showing the construction of the extensions and the carbon blocks carried thereby.

In the construction shown in Fig. 1 the collector comprises a curved portion $b$ rockingly mounted on a pole or bail $m$, the pivotal axis $n$ of the collector being disposed eccentrically of the collector portion $b$. The curved portion $b$ may comprise a core of metal on which a block or blocks of carbon are mounted in the manner known in the art, and the bores of the segmental blocks placed on the said core are likewise curved, in accordance with the curved form of the core. In a modification the curved portion $b$ takes the form of a single curved block of carbon which is supported at its ends. For balancing the collector it is formed with weighted bodies $c$ extending from the curved portion $b$ beyond the fulcrum $n$. Thus the center of gravitation is located below the pivotal axis $n$ of the collector.

In Fig. 2 I have shown a modification in which a curved collector of carbon is used which, however, is not provided with weighted bodies for shifting the centre of gravitation, the centre of gravitation being brought into the proper position relatively to the pivotal axis of the collector by shifting the pivots $d$ towards the middle of the collector, so that the ends $e$ thereof project downwardly beyond the pivotal axis and the system is in stable equilibrium. The free ends $e$ of the carbon collector provide guides which are gradually engaged by slack wires so as to elevate the same onto the curved median part of the collector, so that the collector is not injured by the wire, and the wire is not torn down by the collector.

In such cases in which rectilinear collectors have come into use the objections adhering thereto may be obviated in the manner shown in Fig. 3. As shown in the said figure the median part of the collector located between the pivots $o$ thereof is rectilinear, and to the rectilinear portion curved ends $p$ have been fixed which extend downwardly beyond the pivotal axis $o, o$. Thus the collector is curved only at its ends. It is to be understood that the curved ends $p$ should not be made with metallic contact surfaces, because the occasional arcing between the trolley wire and the collector would cause the production of metal particles or "pearls" (produced from the metal melted from the collector) which projections on the trolley wire scratch and injure the surface of the carbon during the passage of the collector along the wire. For this reason where the extensions $p$ are made from metal such as aluminium they are coated with carbon, at least as far as they make contact with the wire. The ends may be coated with pieces of carbon either by placing thereon blocks of carbon $u$ which are held in position by a dovetail joint, as is shown in Fig. 4, or blocks of carbon $u^1$ may be fixed to the extensions by means of screws $v$, as is shown in Fig. 5. Further, blocks which are fixed in position by means of a dovetail joint may be additionally fixed by means of screws, $v^1$, as is shown in Fig. 6. When fixing the carbon blocks in position by means of metal screws $v$ the heads thereof must be sunk in the body of the carbon, as is shown in Fig. 5, in order to prevent sliding of the wire on the metal heads. Thus a slack wire is prevented from sticking to projecting screw heads. Preferably, the sockets of the collector provided by sinking the screw heads therein are closed by carbon plugs $f$ cemented therein, as is shown in Fig. 5, so that a smooth collector surface is produced. In some cases I use screws $v^1$ made from particularly hard carbon or coal, in lieu of the metal screws, in which case closing of the sockets by means of carbon plugs cemented therein is obviated.

The carbon blocks applied to the contacting surfaces of the extensions must embrace also the sides of the said extensions, so that no metal parts make contact with the wire when the collectors are rocked. As is shown in Figs. 5 and 6, the carbon blocks are formed at both sides with flanges $t$.

In Fig. 7 I have shown a modification in which the median part of the collector is curved, while the ends $g$ thereof are straight. In the modification shown in Fig. 8 also the median part $q$ of the collector is straight, and it has straight extensions $g^1$ secured thereto. The median part $q$ is connected with the end parts $g^1$ by means of curved members $h$ which are likewise coated with carbon $h^1$, and which preferably have ears $r$ secured thereto by means of which the collector is jointed to the pole or bail $s$. The said straight extensions $g^1$ may consist of a metallic core in the form of a pipe or a rod of circular or polygonal cross-section having a circular or polygonal tubular piece of carbon placed thereon, which surrounds the metal core from all sides. Figs. 9 to 11 show three examples of the shape of the core $r$ and the carbon blocks $i$, $k$ and $l$.

In the claims reference is made to a crooked carbon collector, and I wish it to be understood that the said collector is either curved or composed of angularly arranged straight portions, or of straight portions and curved portions, and that it may consist of a solid block of carbon or another suitable material, or of metal having its contact making surface coated with carbon.

I claim:

1. A support, and a carbon collector rockingly and eccentrically mounted on said support and formed with end portions made from metal and having its contact making side covered by carbon pieces fixed thereto by screws, the heads of said screws being sunk within said carbon pieces, and the holes in said carbon pieces being closed by carbon plugs cemented therein.

2. A support, and a carbon collector rockingly and eccentrically mounted on said support and formed with end portions made from metal and having its contact making side covered by carbon pieces fixed thereto by a dovetail joint and by screws, the heads of said screws being sunk within said carbon pieces, and the holes in said carbon pieces being closed by carbon plugs cemented therein.

3. A support, and a carbon collector rockingly and eccentrically mounted on said support and formed with end portions made from metal and having its contact making side covered by carbon pieces fixed thereto by screws made from hard coal.

4. A support, and a carbon collector rockingly and eccentrically mounted on said support and having metallic end portions extending laterally beyond the pivotal axis and having carbon pieces fixed to the contact making side thereof and embracing the sides of said end portions.

OTTMAR CONRADTY.